No. 744,221. PATENTED NOV. 17, 1903.
D. H. NICKERSON.
CAR WHEEL.
APPLICATION FILED JAN. 5, 1903.
NO MODEL. 2 SHEETS—SHEET 1.

Witnesses
M. C. Poole

Inventor
David H. Nickerson
By E. S. Wheeler & Co.
Attorney

No. 744,221. PATENTED NOV. 17, 1903.
D. H. NICKERSON.
CAR WHEEL.
APPLICATION FILED JAN. 5, 1903.
NO MODEL. 2 SHEETS—SHEET 2.
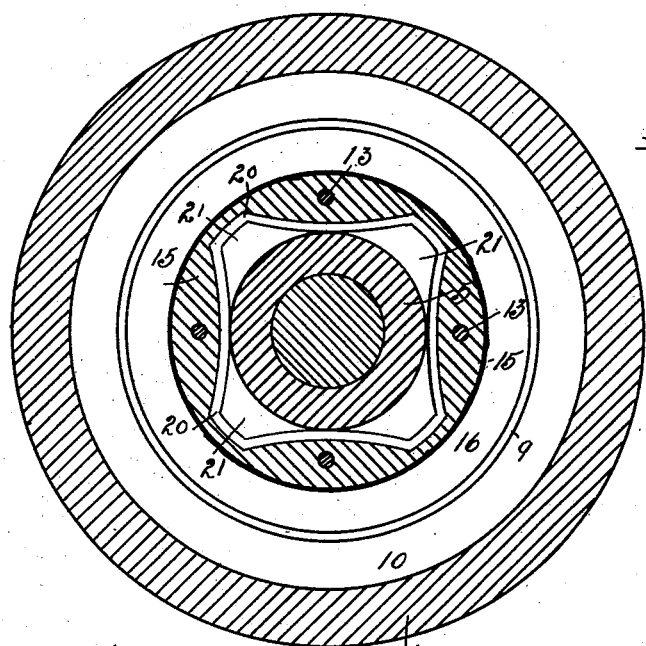
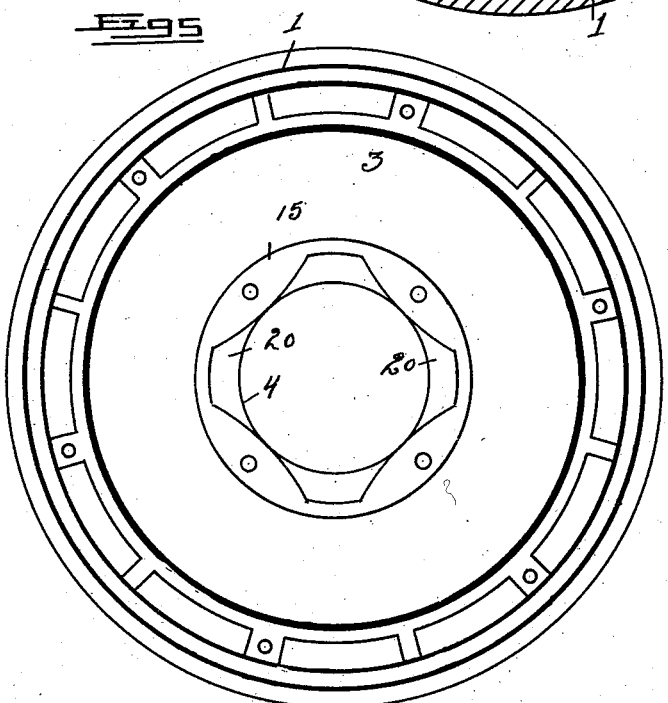
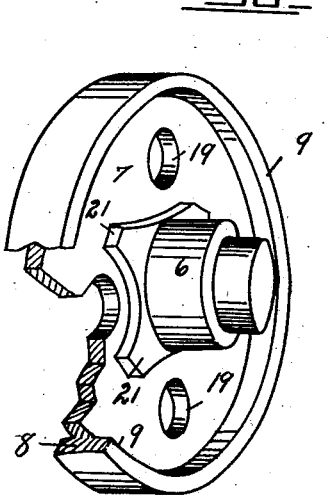
Witnesses
M. E. Poole
C. C. Wright
Inventor
David H. Nickerson
By E. L. Wheeler & Co.
Attorney No. 744,221. Patented November 17, 1903.

UNITED STATES PATENT OFFICE.

DAVID H. NICKERSON, OF DETROIT, MICHIGAN.

CAR-WHEEL.

SPECIFICATION forming part of Letters Patent No. 744,221, dated November 17, 1903.

Application filed January 5, 1903. Serial No. 137,791. (No model.)

*To all whom it may concern:*

Be it known that I, DAVID H. NICKERSON, a citizen of the United States, residing at Detroit, in the county of Wayne, State of Michigan, have invented certain new and useful Improvements in Car-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a cushioned car-wheel; and it consists in the construction and arrangement of parts hereinafter fully set forth, and pointed out particularly in the claims.

The object of the invention is to provide simple and efficient means for suspending the hub of the wheel within the rim or tread upon a cushion of sufficient resiliency as to largely overcome vibration and deaden the sound incident to the passage of the wheels along the track.

The above object is attained by the structure illustrated in the accompanying drawings, in which—

Figure 1:
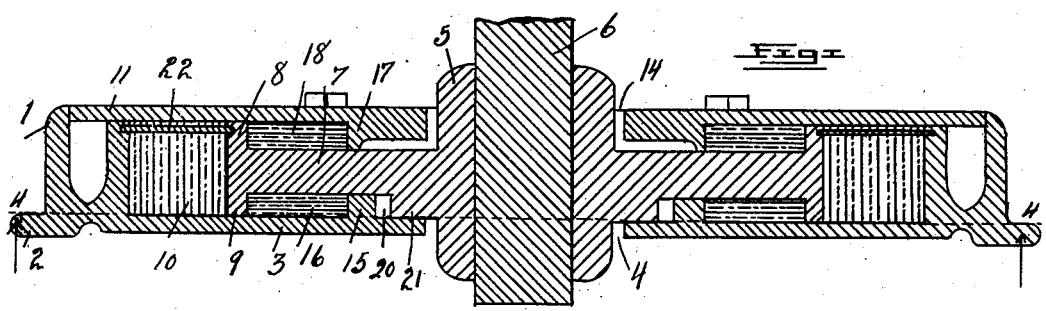
Figure 2:
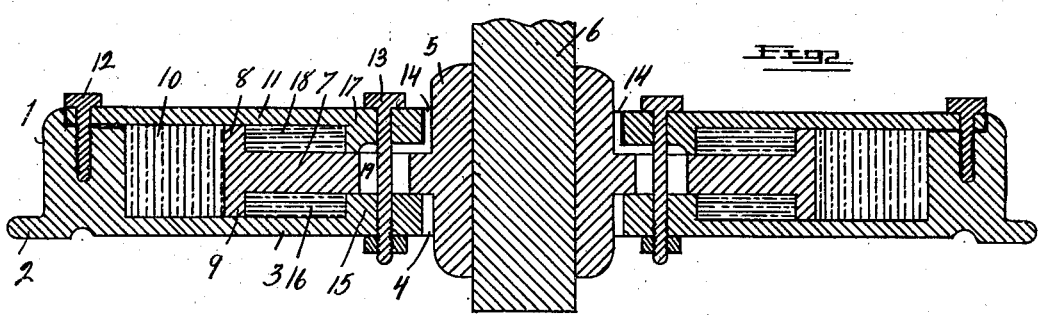
Figure 3:
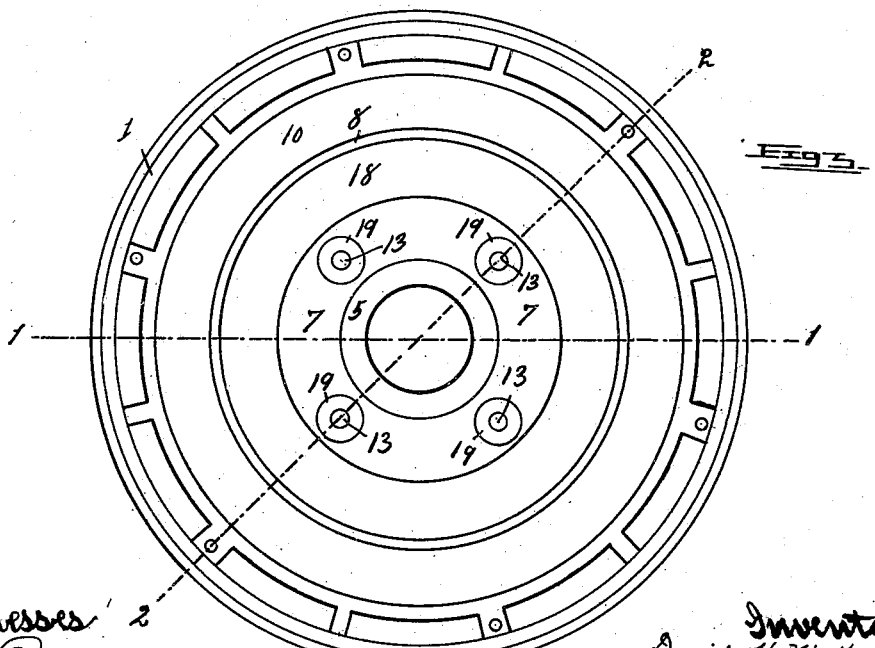

Figure 1 is a diametrical section through the wheel as on line 1 1 of Fig. 3. Fig. 2 is a like section as on line 2 2 of Fig. 3. Fig. 3 is a plan view of the wheel with the detachable side plate removed. Fig. 4 is a circumferential section as on line 4 4 of Fig. 1. Fig. 5 is a plan view of the interior of the wheel with the hub and central disk removed. Fig. 6 is a perspective view of the hub and central disk removed from the wheel, parts being broken away.

Referring to the characters of reference, 1 designates the tread of the wheel, and 2 the flange thereof. Formed integral with the tread portion is a web-plate 3, having a central opening 4 therethrough. The hub of the wheel is indicated at 5 and is bored to snugly receive the axle 6, on which the wheel is fixed in the ordinary manner. The diameter of the hub is less than that of the opening 4 in the web-plate 3, so that the hub when placed in position in the wheel will be disposed centrally in said opening, free from the wall thereof. Formed integral therewith and projecting centrally from the hub 5 is a disk 7, having the laterally-extending flanges 8 and 9, respectively, at its rim. This disk is concentric with the tread of the wheel, but is spaced therefrom. Located between the periphery of said central disk and the inner wall of the tread of the wheel is a cushion 10, of rubber or analogous material. Upon the opposite side of the wheel from the web-plate 3 is a removable web-plate 11, adapted to be secured to the tread of the wheel at its perimeter by the bolts 12 and being secured near its center to the opposed plate 3 by the bolts 13, which pass through said plates and the interposed parts. The removable plate 11 is provided with an enlarged central opening 14, which is concentric with the hub, but spaced therefrom, as shown.

Formed around the central opening 4 through the disk 3 is a raised or inwardly-extending flange 15, which forms an annular shoulder. Lying in the annular space between said shoulder and the inner face of the flange 9 of the central disk 7 is a ring 16, of rubber or analogous material. Formed around the central opening 14 through the removable disk 11 is an inwardly-extending flange 17, which also serves as an annular shoulder. Lying within the annular space formed between said shoulder and the inner face of the flange 8 of the disk 7 is a ring 18, of rubber or analogous material.

Formed through the web of the disk 7 are the apertures 19. Through these apertures pass centrally the bolts 13, which tie the plates 3 and 11 together, the arrangement being such that the disk 7 does not contact with said bolts, thereby permitting a diametrical movement of the hub within the wheel.

It will now be understood from the drawings and the foregoing description that the hub of the wheel is suspended therein and is allowed a diametrical movement with respect to the rim of the wheel within the limit of the resiliency of the compressible cushions, which maintain the disk 7 of the hub in its proper position within the wheel. The weight of the car is applied to the wheel through the axle 6 and is transmitted through the axle to the disk 7, which bears at its lower arc downwardly upon the cushion 10, which being slightly compressible overcomes the extreme rigidity which would otherwise be present between the tread of the wheel and the axle. The tendency of the weight of the car applied through the disk 7 to compress the cushion between the face of said disk and the inner wall of the tread at the lower arc of the wheel is overcome by the compressible rings 16 and 18, which being confined between the annular shoulders 15 and 17 on the respective side plates of the wheel and the inner faces of the flanges 8 and 9 of said disk resist at the upper arc of said disk the tendency of the hub to settle or move downwardly diametrically of the wheel, thereby preventing the hub from becoming unduly eccentric in the wheel and sharing with the cushion 10 the burden of the load carried.

Formed in the inner face of the circular flange 15 of the web-plate 3 are the recesses 20, having curved diverging walls. These recesses are adapted to receive the conical lugs 21 on the hub of the disk 7. As will be seen on referring to Fig. 4, the diameter of said lugs is less than that of the recesses in which they lie, so as to allow a slight rotary movement of the hub within the wheel before the lugs will engage the walls of the recesses, after which any further rotation of the hub in the wheel is prevented. The contact between the lugs and the curved walls of the recesses is not such as to prevent a free diametrical movement of the hub within the wheel, so that while the engagement of said lugs with the walls of the recesses prevents a turning of the hub within the wheel it does not interfere with the diametrical movement of the hub or overcome the cushioning effect of the rings of rubber interposed between the movable disk 7 and the fixed parts of the wheel. It will be noted that by this arrangement the pounding and jarring incident to the travel of the wheel over the track are absorbed in the cushions and are not transmitted to the axle and thence to the car, while the noise is largely deadened by the absence of vibration, which is absorbed in said cushions.

Where wheels of this character are used upon electric railways, it is necessary to maintain an electrical conductor of sufficient capacity between the hub and the tread of the wheel. I accomplish this by using a bond or conductor 22, which extends from the flange of the wheel to the periphery of the disk 7, thereby maintaining the continuity of the electrical conductor between the axle and rail.

Having thus fully set forth my invention, what I claim as new, and desire to secure by Letters Patent, is—

1. In a car-wheel, the combination of the wheel-tread and opposed side disks, one of which is detachable, the hub mounted within said disks free therefrom, and adapted to move diametrically, bolts mounted in the side disks passing freely through the hub, and a cushion interposed between the movable hub and the tread of the wheel.

2. In a car-wheel, the combination of the tread and the opposed disks forming the sides of the wheel, one of said disks being formed integral with said tread, the other being detachable, a hub mounted centrally within said sides so as to move diametrically therein, said hub having an annular disk which lies between the sides of the wheel, and a cushion interposed between the disk of the hub and the tread of the wheel.

3. In a car-wheel, the combination of the tread and opposed sides of the wheel, said sides having a central opening therethrough, a hub disposed in said openings free from the walls thereof, an annular disk upon said hub having at its perimeter a lateral flange, and a resilient cushion interposed between the periphery of said flange and the inner face of the tread of the wheel.

4. In a car-wheel, the combination of the tread and wheel sides, a hub centrally disposed within the wheel sides and spaced therefrom, a circular disk upon the hub lying between the sides of the wheel, and having lateral flanges at its perimeter, the sides of the wheel having inwardly-projecting annular shoulders, resilient cushions interposed between said shoulders and the lateral flanges of the disk of the hub, and an annular cushion interposed between the periphery of said disk and the inner wall of the tread of the wheel.

5. In a car-wheel, the combination of the tread and opposed wheel sides, said sides having a central opening therethrough, a hub disposed centrally in said opening free from the wall thereof, an annular disk upon said hub lying between the sides of the wheel, a resilient cushion between the periphery of said disk and the inner wall of the tread, said disk having a series of apertures therethrough, and bolts passing through the sides of the wheel and through said apertures free from the wall thereof.

6. In a car-wheel, the combination of the tread and opposed wheel sides, said sides having a central opening therethrough, a hub centrally disposed in said opening, and spaced from the wall thereof, an annular disk upon said hub, a resilient cushion interposed between the periphery of said disk and the inner wall of the tread of the wheel, shoulders projecting laterally from the side of the wheel, and lugs upon the hub lying freely between said shoulders.

In testimony whereof I sign this specification in the presence of two witnesses.

DAVID H. NICKERSON.

Witnesses:
E. S. WHEELER,
M. C. POOLE.